(12) United States Patent
Wada et al.

(10) Patent No.: US 12,109,867 B2
(45) Date of Patent: Oct. 8, 2024

(54) THERMAL REQUEST MEDIATING DEVICE FOR CONTROLLING ALLOWABLE AMOUNTS OF DISCHARGED HEAT FOR THERMAL CIRCUITS

(71) Applicants: TOYOTA JIDOSHA KABUSHIKI KAISHA, Toyota (JP); DENSO CORPORATION, Kariya (JP)

(72) Inventors: Ryuichi Wada, Nagoya (JP); Tatsuya Masuhisa, Anjo (JP); Nobukazu Kuribayashi, Kariya (JP); Shinsaku Isomura, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 447 days.

(21) Appl. No.: 17/438,947

(22) PCT Filed: Mar. 13, 2020

(86) PCT No.: PCT/IB2020/000111
§ 371 (c)(1),
(2) Date: Sep. 14, 2021

(87) PCT Pub. No.: WO2020/234638
PCT Pub. Date: Nov. 26, 2020

(65) Prior Publication Data
US 2022/0176771 A1 Jun. 9, 2022

(30) Foreign Application Priority Data
Mar. 20, 2019 (JP) .................................. 2019-053638

(51) Int. Cl.
*B60H 1/00* (2006.01)
*B60H 1/32* (2006.01)

(52) U.S. Cl.
CPC ....... *B60H 1/0073* (2019.05); *B60H 1/00278* (2013.01); *B60H 1/32284* (2019.05); *B60H 2001/00307* (2013.01)

(58) Field of Classification Search
CPC .............. B60H 1/0073; B60H 1/32284; B60H 1/00278; B60H 2001/00307
See application file for complete search history.

(56) References Cited

U.S. PATENT DOCUMENTS

2016/0107505 A1\* 4/2016 Johnston ............ B60H 1/00278
165/202
2017/0008373 A1 1/2017 Makihara et al.
(Continued)

FOREIGN PATENT DOCUMENTS

DE 10 2013 106 831 A1 12/2014
DE 11 2015 001 115 T5 12/2016
(Continued)

*Primary Examiner* — Jess Whittington
*Assistant Examiner* — Terry C Buse
(74) *Attorney, Agent, or Firm* — Oliff PLC

(57) ABSTRACT

A thermal request mediating device (1) that is mounted in a vehicle including a first thermal circuit (LT) and a second thermal circuit (RE) configured to exchange heat with the first thermal circuit, the thermal request mediating device includes: a discharged heat amount acquiring unit configured to requested amounts of discharged heat of the first and second thermal circuits; and a mediation unit configured to determine amounts of discharged heat allowable for the first thermal circuit and the second thermal circuit, and increase the amount of discharged heat allowable for the first thermal circuit and decrease the amount of discharged heat allowable for the second thermal circuit as the first requested amount of discharged heat increases when the sum of the amounts of discharged heat of the first and second thermal circuits exceeds the maximum amount of dischargeable heat.

6 Claims, 9 Drawing Sheets

(56) References Cited

U.S. PATENT DOCUMENTS

| | | |
|---|---|---|
| 2017/0021698 A1 | 1/2017 | Hatakeyama et al. |
| 2017/0217279 A1 | 8/2017 | Jalilevand et al. |
| 2017/0313158 A1 | 11/2017 | Porras et al. |
| 2018/0215231 A1 | 8/2018 | Porras et al. |
| 2019/0273296 A1* | 9/2019 | Porras ................ H01M 10/635 |
| 2020/0298661 A1 | 9/2020 | Wada et al. |

FOREIGN PATENT DOCUMENTS

| | | |
|---|---|---|
| EP | 2 574 482 A1 | 4/2013 |
| JP | 2015-186989 A | 10/2015 |
| JP | 2017-071283 A | 4/2017 |
| JP | 2020-152277 A | 9/2020 |
| WO | 2014/207249 A1 | 12/2014 |

\* cited by examiner

STATE IN WHICH PASSENGER COMPARTMENT IS COOLED AND BATTERY TEMPERATURE IS HIGH

THERMAL REQUEST MEDIATING DEVICE FOR CONTROLLING ALLOWABLE AMOUNTS OF DISCHARGED HEAT FOR THERMAL CIRCUITS

BACKGROUND OF THE INVENTION

1. Field of the Invention

The invention relates to a thermal request mediating device.

2. Description of Related Art

Japanese Patent Application Publication No 2015-186989 (JP 2015-186989 A) discloses a vehicular air conditioner that includes a refrigeration circuit, a low coolant-temperature circuit, and a high coolant-temperature circuit, enables the refrigeration circuit and the high coolant-temperature circuit to exchange heat via a condenser, and enables the refrigeration circuit and the low coolant-temperature circuit to exchange heat via a refrigerant-coolant heat exchanger. In the vehicular air conditioner described in JP 2015-186989 A, improvement in efficiency of the refrigeration circuit can be achieved by providing a subcooling (SC) condenser that can exchange heat between the refrigeration circuit and the low coolant-temperature circuit and promoting cooling of a refrigerant of the refrigeration circuit using the SC condenser.

SUMMARY OF THE INVENTION

Recently, motorization of a vehicle has progressed. In a motor-driven vehicle having a traveling battery mounted therein, it is necessary to cool the traveling battery for the purpose of curbing deterioration. In such a system in which heat can be transferred between a plurality of thermal circuits, when a coolant of a low coolant-temperature circuit is used to cool the traveling battery and to cool a passenger compartment and the traveling battery has a high temperature, heat which is discharged by cooling the traveling battery can be transferred from the low coolant-temperature circuit to the refrigeration circuit.

Since an amount of heat dischargeable from the refrigeration circuit has an upper limit, there is a likelihood that cooling of the passenger compartment will be weakened and comfortableness will be harmed when heat discharged from the battery is transferred to the refrigerant circuit for the purpose of cooling of the battery at the time of cooling the passenger compartment. Accordingly, at the time of cooling a passenger compartment and cooling a battery, it is necessary to mediate amounts of discharged heat of the thermal circuits.

The invention provides a thermal request mediating device that can appropriately mediate amounts of discharged heat of thermal circuits in a vehicle including a thermal circuit for cooling a passenger compartment and a thermal circuit for cooling a battery.

A thermal request mediating device according to an aspect of the invention is mounted in a vehicle including a first thermal circuit configured to circulate a coolant for cooling a battery and a second thermal circuit configured to circulate a refrigerant for an air-conditioner while changing a state of the refrigerant and to exchange heat with the first thermal circuit. The thermal request mediating device includes: a discharged heat amount acquiring unit configured to acquire a first requested amount of discharged heat and a second requested amount of discharged heat, the first requested amount of discharged heat being an amount of discharged heat which is requested to be discharged from the first thermal circuit to the second thermal circuit, and the second requested amount of discharged heat being an amount of discharged heat requested by the second thermal circuit; and a mediation unit configured to determine amounts of discharged heat allowable for the first thermal circuit and the second thermal circuit such that a sum of the first requested amount of discharged heat and the second requested amount of discharged heat does not exceed a maximum amount of dischargeable heat of the second thermal circuit, and increase the amount of discharged heat allowable for the first thermal circuit and decrease the amount of discharged heat allowable for the second thermal circuit as the first requested amount of discharged heat increases when the sum of the first requested amount of discharged heat and the second requested amount of discharged heat exceeds the maximum amount of dischargeable heat.

In the above aspect, the second thermal circuit may be configured to exchange heat with a third thermal circuit that circulates a coolant, and the maximum amount of dischargeable heat may be an amount of heat transferrable from the second thermal circuit to the third thermal circuit.

In the above aspect, the second thermal circuit may include an evaporator configured to absorb heat when a passenger compartment of the vehicle is cooled and the second requested amount of discharged heat may include an amount of heat discharged from the evaporator to the refrigerant.

In the above aspect, the mediation unit may be configured to, when the sum of the first requested amount of discharged heat and the second requested amount of discharged heat exceeds the maximum amount of dischargeable heat, determine the amounts of discharged heat allowable for the first thermal circuit and the second thermal circuit based on a distribution rules including at least one of threshold values of the first requested amount of discharged heat and distribution ratios of the amounts of discharged heat allowable for the first thermal circuit and the amounts of discharged heat allowable for the second thermal circuit.

In the above aspect, the mediation unit may be configured to, when the sum of the first requested amount of discharged heat and the second requested amount of discharged heat exceeds the maximum amount of dischargeable heat, determine the amounts of discharged heat allowable for the first thermal circuit and the second thermal circuit based on a distribution ratio calculated by a genetic algorithm in consideration of conditions other than the first requested amount of discharged heat.

According to the invention, it is possible to provide a thermal request mediating device that can appropriately mediate amounts of discharged heat of thermal circuits in a vehicle including a thermal circuit for cooling a passenger compartment and a thermal circuit for cooling a battery.

BRIEF DESCRIPTION OF THE DRAWINGS

Features, advantages, and technical and industrial significance of exemplary embodiments of the invention will be described below with reference to the accompanying drawings, in which like signs denote like elements, and wherein.

DETAILED DESCRIPTION OF EMBODIMENTS

A thermal request mediating device according to an embodiment of the invention determines amounts of discharged heat allowable for a low-temperature cooing circuit and a refrigerant circuit such that a sum of a requested amount of discharged heat which is discharged from the low-temperature cooing circuit to the refrigerant circuit and a requested amount of discharged heat of the refrigerant circuit does not exceed a maximum amount of dischargeable heat (a cooling capacity) of the second thermal circuit in a vehicle including the refrigerant circuit for cooling a passenger compartment and the low-temperature cooling circuit for cooling a battery. When the sum of the requested amount of discharged heat which is discharged from the low-temperature cooing circuit to the refrigerant circuit and the requested amount of discharged heat of the refrigerant circuit exceeds the maximum amount of dischargeable heat of the second thermal circuit, the thermal request mediating device increases the amount of discharged heat allowable for the low-temperature cooling circuit and decreases the amount of discharged heat allowable for the refrigerant circuit as the requested amount of discharged heat from the low-temperature cooling circuit to the refrigerant circuit increases. Accordingly, it is possible to mediate the amounts of discharged heat of the low-temperature cooling circuit and the refrigerant circuit based on the requested amount of discharged heat of the low-temperature cooling circuit which is determined depending on the temperature of the battery and to achieve compatibility between cooling of the battery and comfortableness of air conditioning.

Embodiment

Configuration

Figure 1:
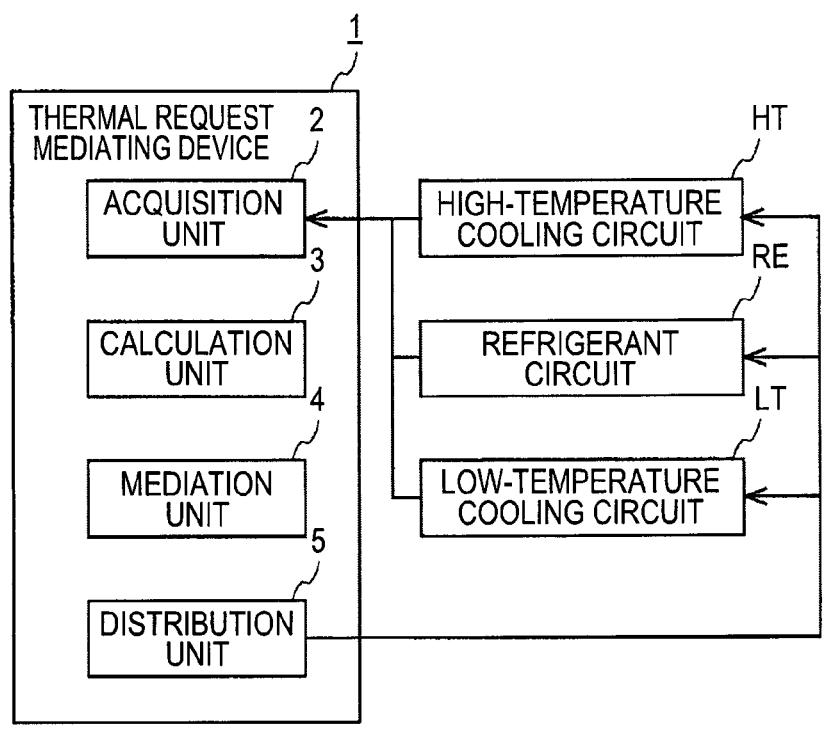
FIG. 1 is a functional block diagram schematically illustrating configurations of a thermal request mediating device and thermal circuits according to an embodiment.

FIG. 1 is a functional block diagram schematically illustrating configurations of a thermal request mediating device and thermal circuits according to an embodiment.

A thermal request mediating device 1 is a device that is mounted in a vehicle including three thermal circuits such as a high-temperature cooling circuit HT, a low-temperature cooling circuit LT, and a refrigerant circuit RE and mediates thermal requests from a plurality of units included in the thermal circuits. The thermal request mediating device 1 can communicate with controllers of the units included in the thermal circuits via an onboard network. The high-temperature cooling circuit HT, the low-temperature cooling circuit LT, and the refrigerant circuit RE each include a flow passage in which a heat medium circulates. The units included in each thermal circuit can exchange heat with the heat medium. The refrigerant circuit RE is coupled to the high-temperature cooling circuit HT and the low-temperature cooling circuit LT such that heat exchange therewith is possible. Here, a thermal request from each unit is information including a value of an amount of absorbed heat or an amount of discharged heat which is requested by the unit. In this embodiment, an amount of absorbed heat or an amount of discharged heat is expressed by an amount of thermal energy transferred per unit time (a work ratio with a unit of W). In the following description, for the purpose of convenience of explanation, an amount of absorbed heat or an amount of discharged heat which is requested by a unit is referred to as an "amount of requested heat of a unit" and an amount of absorbed heat or an amount of discharged heat which is requested by a thermal circuit is referred to as an "amount of requested heat of a thermal circuit."

The thermal request mediating device 1 includes an acquisition unit 2, a calculation unit 3, a mediation unit 4, and a distribution unit 5. The acquisition unit 2 acquires amounts of heat requested by controllers of a plurality of units included in each thermal circuit by communication. The calculation unit 3 collects the amounts of heat requested by the plurality of units acquired by the acquisition unit 2 for each thermal circuit and calculates an amount of heat requested by each thermal circuit. The mediation unit 4 determines an allowable amount of heat allocated to each thermal circuit based on the amount of heat requested by each thermal circuit calculated by the calculation unit 3, an amount of heat transferable between the high-temperature cooling circuit HT and the refrigerant circuit RE, and an amount of heat transferable between the low-temperature cooling circuit LT and the refrigerant circuit RE. The amount of allocated heat is an amount of absorbed heat or an amount of discharged heat which is allocated to each thermal circuit. In this embodiment, the amount of heat transferable between thermal circuits and the amount of heat allocated to each thermal circuit are expressed by an amount of thermal energy transferred per unit time, similarly to the amounts of requested heat. The distribution unit 5 distributes the amounts of heat to the units included in each thermal circuit based on the amount of heat allocated to each thermal circuit determined by the mediation unit 4. Details of the process which is performed by the thermal request mediating device 1 will be described later.

Figure 2A:
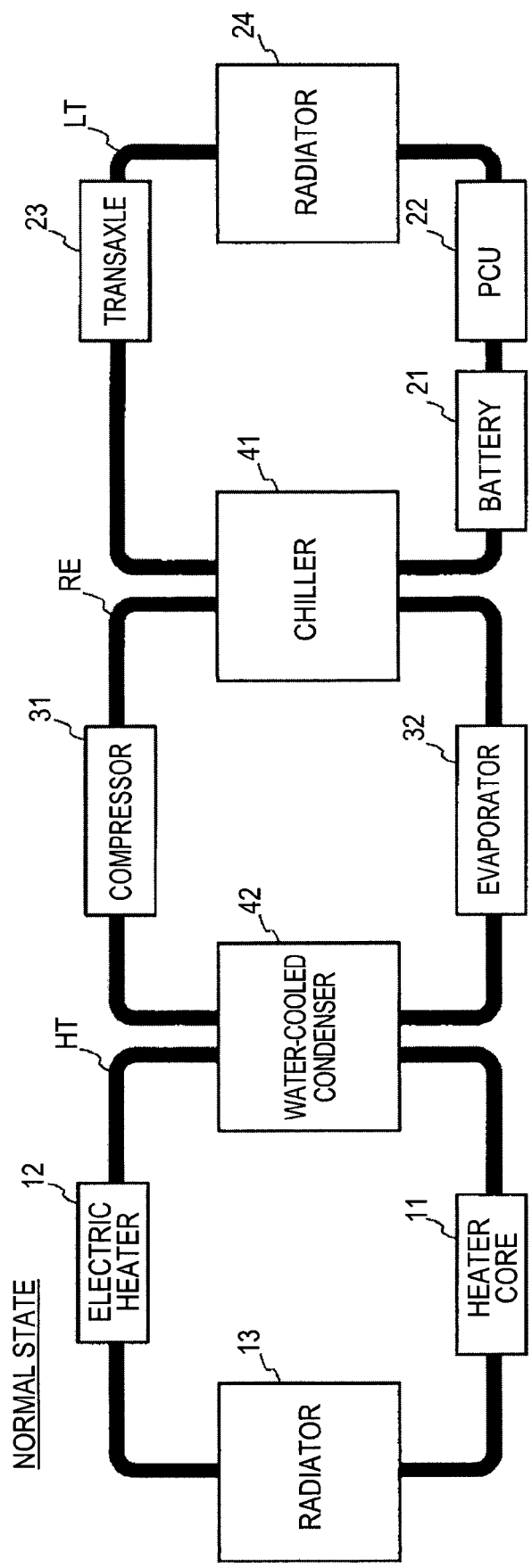
FIG. 2A is a block diagram illustrating an example of configurations of the thermal circuits illustrated in FIG. 1.

FIG. 2A is a block diagram illustrating an example of configurations of the thermal circuits illustrated in FIG. 1. In FIG. 2A, flow passages in which a heat medium circulates are illustrated by bold lines.

The high-temperature cooling circuit HT is a circuit that circulates a coolant and includes a heater core 11, an electric heater 12, a radiator 13, and a water pump (not illustrated) that circulates the coolant. The high-temperature cooling circuit HT has a function of accumulating heat in a coolant to heat a passenger compartment and a function of discharging heat received from the refrigerant circuit RE by heat exchange to the outside of the vehicle. The heater core 11 is a unit that includes a tube in which a coolant flows and a fin and performs heat exchange between the coolant and air passing through the fin. The electric heater 12 is a unit that heats a coolant when the temperature of the coolant is insufficient. The radiator 13 is a unit that cools a coolant with air, and includes a radiator core that includes a tube in which a coolant flows and a fin and performs heat exchange between air passing through the fin and the coolant, a grille shutter that is provided in front of the radiator core and increases or decreases an amount of air passing through the radiator core, and a radiator fan that is provided behind the radiator core and forcibly blows air to the radiator core.

In the high-temperature cooling circuit HT, the heater core 11 and the radiator 13 are units that can absorb heat from a coolant, and the electric heater 12 is a unit that can discharge heat to the coolant. The water pump performs neither absorption nor discharge of heat, but is a unit that can change an amount of heat discharged from the radiator 13 and an amount of heat transferred to the refrigerant circuit RE via a water-cooled condenser 42 which will be described later based on a flow rate of the coolant.

Figure 2B:
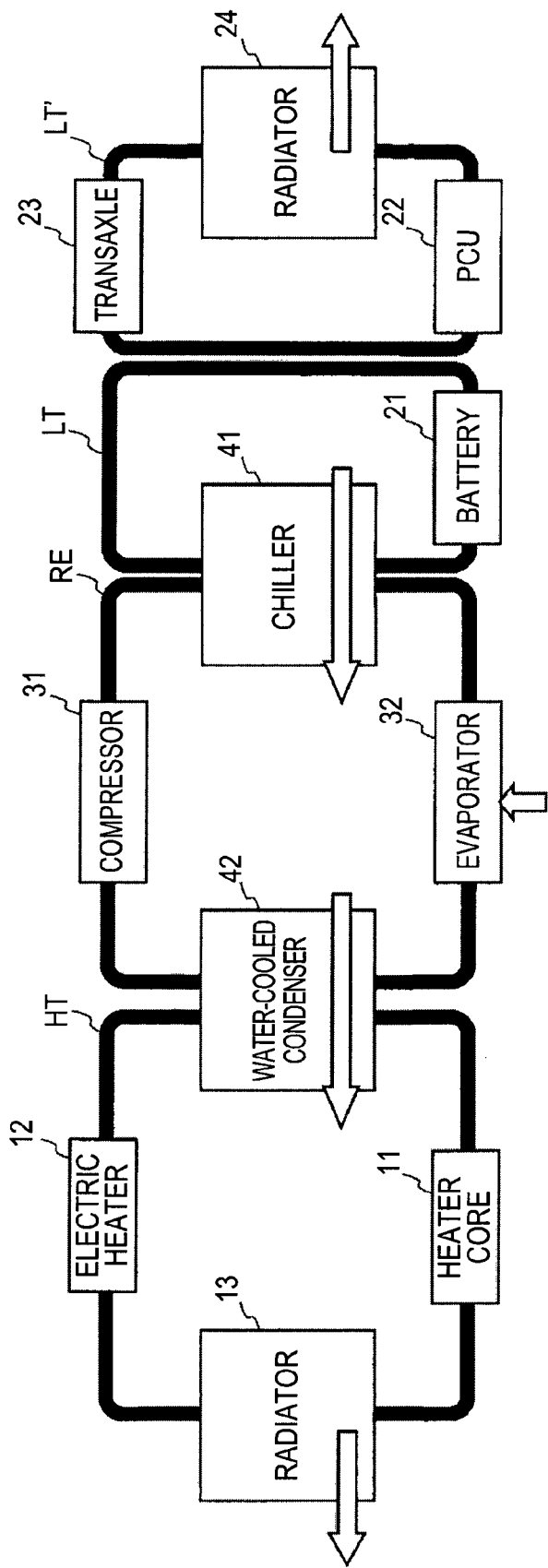
FIG. 2B is a block diagram illustrating an example of configurations of the thermal circuits illustrated in FIG. 1.

The low-temperature cooling circuit LT is a circuit that circulates a coolant and includes a battery 21, a power control unit (hereinafter referred to as a "PCU") 22, a transaxle (hereinafter referred to as a "TA") 23, a radiator 24, and a water pump (not illustrated) that circulates the coolant. The battery 21 is a unit that stores electric power which is supplied to a traveling motor. The PCU 22 is a unit that includes an inverter driving the traveling motor and a DCDC converter converting a voltage and controls electric power which is supplied to the traveling motor. The TA 23 is a unit in which the traveling motor, a power generator, a power split mechanism, and a transmission are incorporated into one body. The radiator 24 is a unit that cools a coolant with air, and includes a radiator core that includes a tube in which a coolant flows and a fin and performs heat exchange between air passing through the fin and the coolant, a grille shutter that is provided in front of the radiator core and increases or decreases an amount of air passing through the radiator core, and a radiator fan that is provided behind the radiator core and forcibly blows air to the radiator core. A coolant flow passage in the low-temperature cooling circuit LT can be changed by opening or closing a valve which is not illustrated, and can be switched between a flow passage for cooling the battery 21 and a flow passage for cooling the PCU 22 and the TA 23 as illustrated in FIG. 2B which will be described later. By enabling switching between the flow passage for the battery 21 and the flow passage for the PCU 22 and the TA 23, it is possible to appropriately change a transfer destination of heat which is generated in the low-temperature cooling circuit LT depending on the temperature of the battery 21.

In the low-temperature cooling circuit LT, the radiator 24 is a unit that can absorb heat from a coolant, and the battery 21, the PCU 22, and the TA 23 are units that can discharge heat to the coolant via a water jacket constituting a part of a flow passage of the coolant. The water pump performs neither absorption nor discharge of heat, but is a unit that can control an amount of heat discharged from the battery 21, the PCU 22, and the TA 23 to the coolant, an amount of heat discharged from the radiator 24, and an amount of heat transferred to the refrigerant circuit RE via a chiller 41 which will be described later based on a flow rate of the coolant. Since the low-temperature cooling circuit LT is provided to cool the battery 21, the PCU 22, and the TA 23 and to secure reliability, the temperature of the coolant circulating in the low-temperature cooling circuit LT is normally kept lower than the temperature of the coolant circulating in the high-temperature cooling circuit HT.

In the following description, for the purpose of distinction between the coolant in the high-temperature cooling circuit HT and the coolant in the low-temperature cooling circuit LT, the former may be referred to as a "high-temperature coolant" and the latter may be referred to as a "low-temperature coolant."

The refrigerant circuit RE is a circuit that circulates a refrigerant while changing the state thereof and includes a compressor 31, an evaporator 32, and a water-cooled condenser 42. In the refrigerant circuit RE, heat can be absorbed from air around the evaporator 32 by condensing the refrigerant compressed by the compressor 31 using the water-cooled condenser 42 and spraying the condensed refrigerant from an expansion valve provided in the evaporator 32 into the evaporator 32 to expand the refrigerant. In the refrigerant circuit RE, the compressor 31 and the evaporator 32 are units that can discharge heat to the refrigerant. The water-cooled condenser 42 is a unit that can absorb heat from the refrigerant and discharge heat to the coolant in the high-temperature cooling circuit HT.

The refrigerant circuit RE is coupled to the low-temperature cooling circuit LT via the chiller 41 such that heat exchange therewith is possible, and can transfer heat generated in the low-temperature cooling circuit LT to the refrigerant circuit RE via the chiller 41. The refrigerant circuit RE is coupled to the high-temperature cooling circuit HT via the water-cooled condenser 42 such that heat exchange therewith is possible, and can transfer heat generated in the refrigerant circuit RE and/or heat transferred from the low-temperature cooling circuit LT to the refrigerant circuit RE to the high-temperature cooling circuit HT via the water-cooled condenser 42.

In FIG. 2A, thermal circuits which are mounted in an electric motor-driven vehicle are exemplified, but the thermal request mediating device according to this embodiment can be applied to a hybrid vehicle. In a hybrid vehicle, the high-temperature cooling circuit HT can be used to cool an engine.

FIG. 2B is a block diagram illustrating an example of a configuration of the thermal circuits illustrated in FIG. 1 and illustrating a circuit configuration and heat transfer when a passenger compartment is cooled and a battery temperature is high. In FIG. 2B, heat transfer directions when a passenger compartment is cooled and a battery temperature is high are denoted by arrows.

When a passenger compartment is cooled, the evaporator 32 of the refrigerant circuit RE absorbs heat with evaporation of a refrigerant. Heat which is absorbed in the coolant via the evaporator 32 is discharged as condensation heat due to cooling of the coolant in the water-cooled condenser 42 to the coolant in the high-temperature cooling circuit HT along with compression heat which is generated by compressing the coolant in the compressor 31.

Heat which is generated in the low-temperature cooling circuit LT is discharged from the radiator 24 of the low-temperature cooling circuit LT to the outside of the vehicle and, for example, when the temperature of the battery 21 is high and an outside air temperature is high, all heat which is generated in the battery 21, the PCU 22, and the TA 23 may not be discharged from the radiator 24. In this case, as illustrated in FIG. 2B, the flow passage for cooling the battery is separated from the flow passage for cooling other units and cooling of the battery 21 is achieved using the refrigerant circuit RE. In the following description, a thermal circuit for cooling the battery which is coupled to the refrigerant circuit RE in a heat exchangeable manner out of the two separated low-temperature cooling circuits is referred to as a low-temperature cooling circuit LT, and a thermal circuit including the PCU 22, the TA 23, and the radiator 24 is referred to as a low-temperature cooling circuit LT'. Heat which is generated in the PCU 22 and the TA 23 of the low-temperature cooling circuit LT' is discharged from the radiator 24 to the outside of the vehicle. On the other hand, heat which is generated in the battery 21 of the low-temperature cooling circuit LT is transferred from the coolant of the low-temperature cooling circuit LT to the refrigerant of the refrigerant circuit RE by heat exchange in the chiller 41. The heat which is discharged from the low-temperature cooling circuit LT to the refrigerant circuit RE is discharged as condensation heat to the coolant of the high-temperature cooling circuit HT in the water-cooled condenser 42.

When a passenger compartment is cooled, generally, discharge of heat from the heater core 11 and overheating of the coolant by the electric heater 12 are not performed and thus all the heat discharged from the refrigerant circuit RE via the water-cooled condenser 42 is discharged from the radiator 13 to the outside of the vehicle in the high-temperature cooling circuit HT. However, when a passenger compartment is cooled, heat may be discharged from the heater core 11 if necessary.

A hierarchical structure of functions of the thermal request mediating device will be described below with reference to FIGS. 3 and 4.

Figure 3:
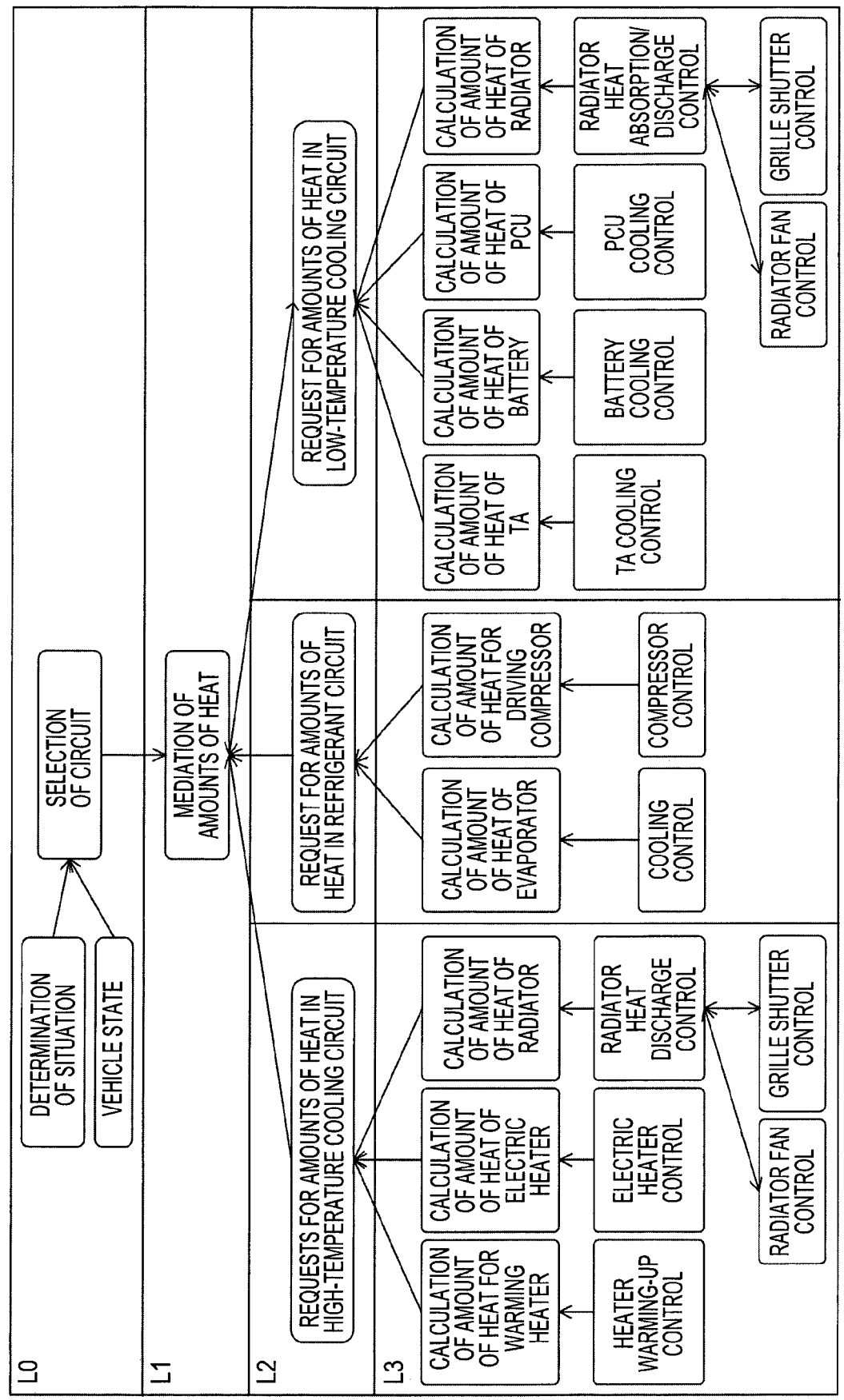
FIG. 3 is a diagram illustrating a hierarchical structure of functions of the thermal request mediating device in a thermal request collection phase.

FIG. 3 is a diagram illustrating a hierarchical structure of functions of the thermal request mediating device in a thermal request collection phase. FIG. 4 is a diagram illustrating a hierarchical structure of functions of the thermal request mediating device in a response phase.

Control of thermal circuits according to this embodiment includes a thermal request collection phase in which thermal requests generated in units of the vehicle are collected and a response phase in which the collected thermal requests are mediated and amounts of absorbed heat or amounts of discharged heat which are distributed based on the result of mediation are returned to the units. Control which is performed in each of the thermal request collection phase and the response phase is layered into three control layers. Processes which are performed in the control layers are as follows.

Layer 1 (L1): The thermal request mediating device 1 mediates amounts of heat requested by three thermal circuits based on the amounts of heat requested by the thermal circuits and amounts heat transferable between the thermal circuits, and determines amounts of absorbed heat or amounts of discharged heat which are allocated to the thermal circuits and amounts of heat transferred between the thermal circuits. In Layer 1, by mediating the amounts of heat requested by the thermal circuits and the amounts of heat transferred between the thermal circuits, it is possible to effectively use amounts of heat which are generated in the three thermal circuits and to achieve optimization in heat utilization efficiency in the whole vehicle and cooling efficiency of the units. For example, it is possible to efficiently perform use of discharged heat which is generated due to cooling of the units for heating the passenger compartment or promotion of cooling of the units using a plurality of thermal circuits.

Layer 2 (L2): The thermal request mediating device 1 mediates thermal requests of the units in each thermal circuit and distributes amounts of heat to the units. By performing mediation of the thermal requests in each thermal circuit in Layer 2 separately from mediation of the thermal requests between the thermal circuits in Layer 1, it is possible to efficiently perform mediation of the thermal requests. Even when constituent units in each thermal circuit change due to a difference in vehicle model, grade, or the like, the change in constituent units does not affect mediation of the thermal requests between the thermal circuits and thus it is not necessary to change the entire mediation function and it is possible to improve versatility of the thermal request mediating device 1.

Layer 3 (L3): A controller such as an ECU that controls the units controls amounts of heat absorbed from a heat medium by the units or amounts of heat discharged to the heat medium. The increase or decrease of an amount of heat absorbed from the heat medium by a unit can be performed, for example, by controlling a flow passage or a flow rate of a high-temperature coolant flowing in the heater core 11, a rotation speed of the fan or an opening level of the grill shutter 25 of the radiator 13 or 24, or a flow rate of a coolant adjusted by the water pump. The increase or decrease of an amount of heat discharged to the heat medium by a unit can be performed, for example, by controlling an output of the electric heater 12, an output of the compressor 31, an opening level of the expansion valve of the evaporator 32, or power consumption from the battery 21 by the PCU 22 and the TA 23. In order to efficiently control amounts of absorbed heat, amounts of discharged heat, and amounts of transferred heat, it is preferable to cooperatively perform control for increasing or decreasing the amounts of absorbed heat and control for increasing or decreasing the amounts of discharged heat in the thermal circuits.

Figure 4:
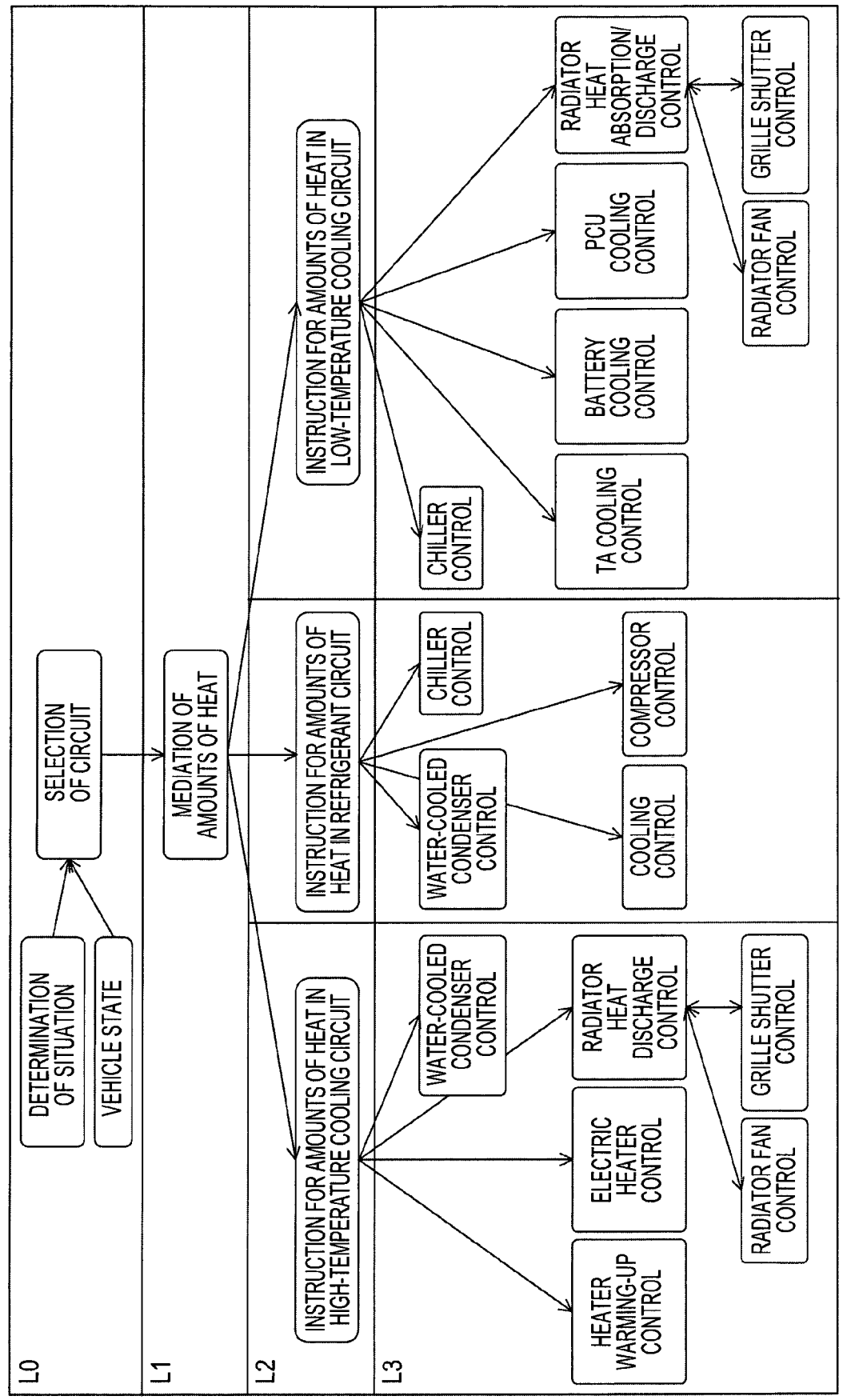
FIG. 4 is a diagram illustrating a hierarchical structure of functions of the thermal request mediating device in a response phase.

In the example illustrated in FIGS. 3 and 4, a control layer of performing selection of a thermal circuit to be used for meeting the thermal requests, change of a flow passage in each thermal circuit, or the like based on a situation such as an air-conditioning state (Off, heating, dehumidification-heating, cooling) or a charged state of a battery (with/without being charged) and a vehicle state such as a temperature of a coolant is provided as Layer 0 (L0). Separation and coupling of the flow passages in the low-temperature cooling circuit LT can be switched based on a cooling set state, a temperature of a low-temperature coolant, a battery temperature, or the like which is acquired in Layer 0 by the thermal request mediating device 1.

The control layers in the thermal request collection phase and the response phase will be specifically described below in accordance with the sequence of the mediation process.

Thermal Request Collection Phase

L3: In the thermal request collection phase illustrated in FIG. 3, first, the controllers of the units which are included in each thermal circuit and which perform absorption of heat or discharge of heat calculate amounts of absorbed heat or amounts of discharged heat which are requested as control of Layer 3. The controller of each unit calculates an amount of heat absorbed or discharged by the unit as an amount of heat absorbed or discharged per unit time which is required for reaching a target control value (temperature). Since heat mediums in the thermal circuits are different, it is difficult to collect and mediate thermal requests of the thermal circuits using only the temperatures, but it is possible to easily perform collection of thermal requests in Layer 2 and comparison and mediation of the thermal requests between the thermal circuits in Layer 1 by unifying the units of the thermal requests.

L2: Then, as control of Layer 2, the thermal request mediating device 1 acquires requested amounts of heat which are calculated in the control of Layer 3 from the units which request absorption or discharge of heat. The thermal request mediating device 1 collects the acquired amounts of heat requested by the thermal circuits and calculates a total requested amount of heat of the high-temperature cooling circuit HT, a total requested amount of heat of the low-temperature cooling circuit LT, and a total requested amount of heat of the refrigerant circuit RE.

L1: Then, as control of Layer 1, the thermal request mediating device 1 collects the requested amounts of heat of the thermal circuits which are calculated through the control of Layer 2 and ascertains the amounts of absorbed heat or amounts of discharged heat which are requested by the thermal circuits.

Response Phase

L1: In the response phase illustrated in FIG. 4, first, as control of Layer 1, the thermal request mediating device 1 mediates the amounts of heat requested by the thermal circuits which are collected in the thermal request collection phase and allocates amounts of absorbed heat or amounts of discharged heat which are allowable to the thermal circuits. At this time, the thermal request mediating device 1 acquires amounts of heat transferable between the thermal circuits and determines amounts of heat which are allocated to the thermal circuits based on the acquired amounts of transferable heat. The amount of heat transferable from the low-temperature cooling circuit LT to the refrigerant circuit RE via the chiller 41 can be calculated based on a flow rate of a low-temperature coolant which is controlled by the water pump of the low-temperature cooling circuit LT and a temperature difference between the coolant and the refrigerant. The amount of heat transferable from the refrigerant circuit RE to the high-temperature cooling circuit HT can be calculated based on a control value of the compressor 31 included in the refrigerant circuit and a temperature difference between the refrigerant and the high-temperature coolant. When the radiators 13 and 24 are provided like the high-temperature cooling circuit HT and the low-temperature cooling circuit LT illustrated in FIGS. 2A and 2B, the thermal request mediating device 1 can further acquire an amount of heat dischargeable to the outside of the vehicle from one or both of the radiators 13 and 24 and determine the amounts of absorbed heat or amounts of discharged heat which are allocated to the thermal circuits in additional consideration of the acquired amounts of heat dischargeable.

L2: Then, as control of Layer 2, the thermal request mediating device 1 distributes the amounts of absorbed heat or amounts of discharged heat to the plurality of units included in each thermal circuit based on the amounts of absorbed heat or amounts of discharged heat which are allocated to the thermal circuits in the control of Layer 1. Distribution of the amounts of absorbed heat or amounts of discharged heat in the control of Layer 2 can be performed based on a predetermined priority order of the units or a predetermined distribution rule. The thermal request mediating device 1 outputs the distributed amounts of absorbed heat or amounts of discharged heat to the controllers of the units.

L3: Then, as control of Layer 3, the controllers of the units included in each thermal circuit control the units based on the amounts of absorbed heat or amounts of discharged heat which are distributed by the thermal request mediating device 1.

Control Process

Figure 5:
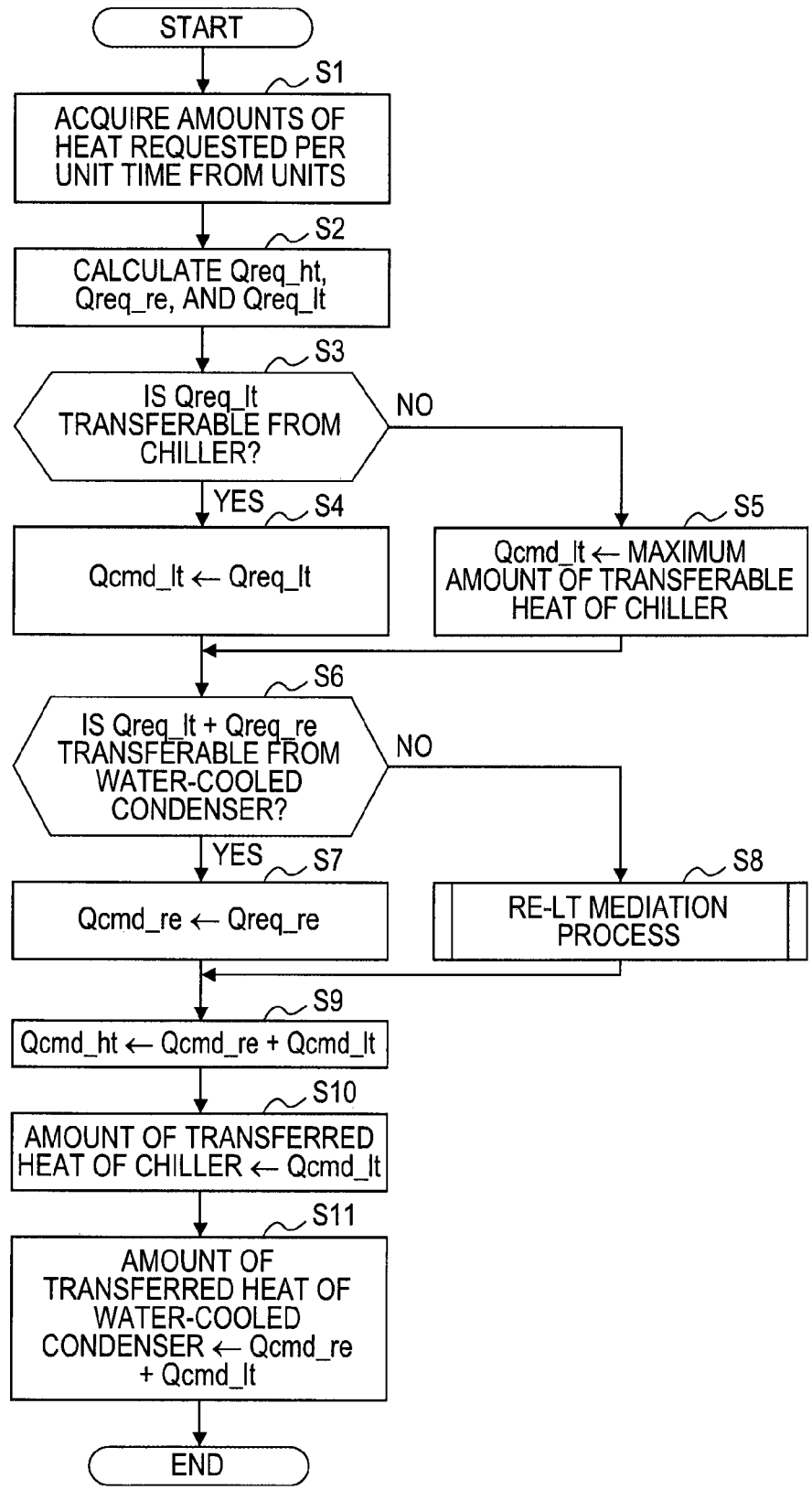
FIG. 5 is a flowchart illustrating a control process which is performed for the thermal request mediating device to mediate thermal requests.
Figure 6:
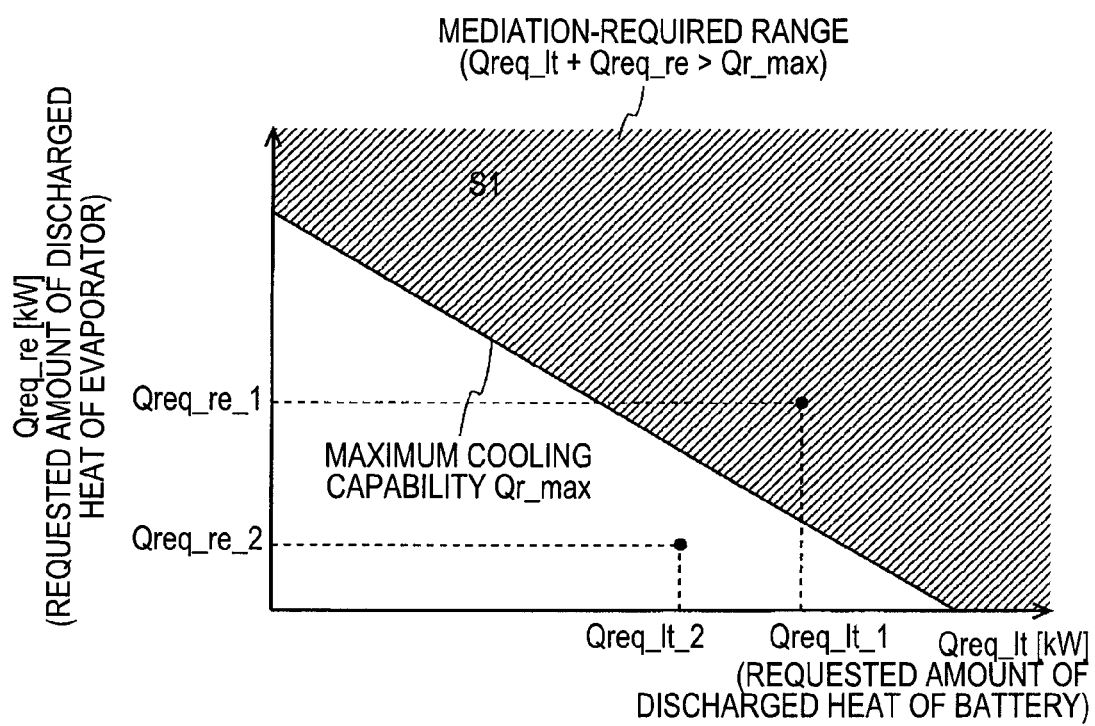
FIG. 6 is a diagram illustrating a relationship between amounts of heat requested by a low-temperature cooling circuit and a refrigerant circuit.

FIG. 5 is a flowchart illustrating a control process which is performed for the thermal request mediating device to mediate thermal requests. FIG. 6 is a diagram illustrating a relationship between amounts of requested heat of the low-temperature cooling circuit and the refrigerant circuit and a maximum cooling capacity. The control process illustrated in FIG. 5 is started with starting of the vehicle and is repeatedly performed at intervals of a predetermined time.

Step S1: The acquisition unit 2 acquires amounts of heat requested by the units included in the high-temperature cooling circuit HT, the low-temperature cooling circuit LT, and the refrigerant circuit RE. An amount of requested heat of each unit is an amount of absorbed heat or an amount of discharged heat which is requested by the unit and can be expressed by a numerical value with inverted signs. When none of absorption and discharge of heat are requested, the amount of requested heat is set to zero. As described above, the units of the amounts of heat can be preferably unified into amounts of thermal energy transferred per unit time in order to easily perform collection, comparison, and mediation of the amounts of requested heat. Thereafter, the control process progresses to Step S2.

Step S2: The calculation unit 3 collects the amounts of requested heat of the units acquired in Step S1 by the acquisition unit 2 for each thermal circuit and calculates a total amount of requested heat $Qreq\_ht$ of the high-temperature cooling circuit HT, a total amount of requested heat $Qreq\_lt$ of the low-temperature cooling circuit LT, and a total amount of requested heat $Qreq\_re$ of the refrigerant circuit RE. By expressing the amounts of requested heat acquired in Step S1 as amounts of thermal energy transferred per unit time, it is possible to easily perform the calculation process of Step S2 by addition and subtraction. Thereafter, the control process progresses to Step S3.

Step S3: The mediation unit 4 determines whether the amount of requested heat $Qreq\_lt$ of the low-temperature cooling circuit LT is transferable to the refrigerant circuit RE via the chiller 41. This determination can be performed based on a maximum amount of transferable heat of the chiller 41 which is calculated using a current temperature difference between the low-temperature coolant and the refrigerant or a current flow rate of the low-temperature coolant which is controlled by the water pump. The control process progresses to Step S4 when the determination result of Step S3 is YES, and the control process progresses to Step S5 otherwise.

Step S4: The mediation unit 4 sets the amount of requested heat $Qreq\_lt$ as the amount of allocated heat $Qcmd\_lt$ of the low-temperature cooling circuit LT. Thereafter, the control process progresses to Step S6.

Step S5: The mediation unit 4 sets the maximum amount of transferable heat of the chiller 41 as the amount of allocated heat $Qcmd\_lt$ to the low-temperature cooling circuit LT. Thereafter, the control process progresses to Step S6.

Step S6: The mediation unit 4 determines whether the sum of the amount of requested heat $Qreq\_lt$ of the low-temperature cooling circuit LT and the amount of requested heat $Qreq\_re$ of the refrigerant circuit RE is transferable to the high-temperature cooling circuit HT via the water-cooled condenser 42, that is, whether the sum of the amount of requested heat $Qreq\_lt$ and the amount of requested heat $Qreq\_re$ is equal to or less than a maximum amount of dischargeable heat of the refrigerant circuit RE (the maximum cooling capacity of the refrigerant circuit RE). The maximum amount of dischargeable heat of the refrigerant circuit RE is a maximum amount of transferable heat of the water-cooled condenser 42, and can be calculated using a current temperature difference between the high-temperature coolant and the refrigerant, a current flow rate of the high-temperature coolant, or the like.

As illustrated in FIG. 2B, when cooling of a passenger compartment and cooling of the battery 21 are simultaneously requested in a state in which the flow passage of the low-temperature coolant is divided into two flow passages, the amount of requested heat $Qreq\_lt$ of the low-temperature cooling circuit LT in FIG. 2B is the same as the amount of discharged heat requested by the battery 21, and the amount of requested heat Qreq_re of the refrigerant circuit RE is the same as an amount of discharged heat requested by the evaporator 32. Since the amounts of discharged heat requested by the battery 21 and the evaporator 32 change depending on a use state of the battery, cooling temperature settings, the temperature of a passenger compartment, or the like, a group of the amount of requested heat Qreq_lt of the low-temperature cooling circuit LT and the amount of requested heat Qreq_re of the refrigerant circuit RE can have various values as illustrated in FIG. 6. In the example illustrated in FIG. 6, when the amount of requested heat of the low-temperature cooling circuit LT is Qreq_lt_1 and the amount of requested heat of the refrigerant circuit RE is Qreq_re_1, the sum thereof is greater than the maximum cooling capacity Qr_max of the refrigerant circuit RE and thus it is necessary to mediate the thermal requests of the low-temperature cooling circuit LT and the refrigerant circuit RE (which corresponds to a case in which the determination result of Step S6 is NO). On the other hand, in the example illustrated in FIG. 6, when the amount of requested heat of the low-temperature cooling circuit LT is Qreq_lt_2 and the amount of requested heat of the refrigerant circuit RE is Qreq_re_2, the sum thereof is equal to or less than the maximum cooling capacity Qr_max of the refrigerant circuit RE, thus it is not necessary to mediate the thermal requests, and the amounts of requested heat of the low-temperature cooling circuit LT and the refrigerant circuit RE are allocated as allowable amounts of discharged heat without any change (which corresponds to a case in which the determination result of Step S6 is YES).

The control process progresses to Step S7 when the determination result of Step S6 is YES, and the control process progresses to Step S8 otherwise.

Step S7: The mediation unit 4 sets the amount of requested heat Qreq_re as the amount of allocated heat Qcmd_re of the refrigerant circuit RE. Thereafter, the control process progresses to Step S9.

Step S8: The mediation unit 4 mediates the thermal requests of the refrigerant circuit RE and the low-temperature cooling circuit LT by performing an RE-LT mediation process, and allocates amounts of discharged heat allowable for the refrigerant circuit RE and the low-temperature cooling circuit LT such that they are not greater than the maximum amount of dischargeable heat of the refrigerant circuit RE. Details of the control process which is performed in Step S8 will be described later. Thereafter, the control process progresses to Step S9.

Step S9: The mediation unit 4 sets the sum of the amount of allocated heat Qcmd_re of the refrigerant circuit RE and the amount of allocated heat Qcmd_lt of the low-temperature cooling circuit LT as the amount of allocated heat Qcmd_ht of the high-temperature cooling circuit HT. Thereafter, the control process progresses to Step S10.

Step S10: The mediation unit 4 sets the amount of allocated heat Qcmd_lt of the low-temperature cooling circuit LT as the amount of transferred heat of the chiller 41. Thereafter, the control process progresses to Step S11.

Step S11: The mediation unit 4 sets the sum of the amount of allocated heat Qcmd_re of the refrigerant circuit RE and the amount of allocated heat Qcmd_lt of the low-temperature cooling circuit LT as the amount of transferred heat of the water-cooled condenser 42. Thereafter, the control process ends.

Through the control process of Steps S1 to S11 described above, it is possible to mediate the amounts of requested heat of the thermal circuits and to allocate the amounts of absorbed heat or amounts of discharged heat to the thermal circuits.

When the radiator 24 is provided in the low-temperature cooling circuit LT and the coolant flow passage of the low-temperature cooling circuit LT is not separated as in the configuration illustrated in FIG. 2A, an amount of heat dischargeable from the radiator 24 may be additionally considered. Specifically, a step of causing the mediation unit 4 to determine whether the requested amount of discharged heat of the low-temperature cooling circuit LT is able to be discharged from the radiator 24 to the outside is provided before Step S3. In this case, the amount of requested heat Qreq_lt of the low-temperature cooling circuit LT is defined as an amount of heat transferred to the refrigerant circuit RE (an amount of heat which is not able to be discharged from the radiator 24). When the requested amount of discharged heat of the low-temperature cooling circuit LT can be discharged from the radiator 24 to the outside of the vehicle, the amount of requested heat Qreq_lt is set to zero. Otherwise, the amount of requested heat Qreq_lt can be set to an amount of heat obtained by subtracting the amount of heat dischargeable of the radiator 24 from the requested amount of discharged heat of the low-temperature cooling circuit LT.

When the radiator 13 is provided in the high-temperature cooling circuit HT as in the configuration illustrated in FIG. 2A, it is preferable to consider an amount of heat dischargeable from the radiator 13. Specifically, when the amount of transferable heat of the water-cooled condenser 42 which is used for the determination of Step S6 is acquired, the mediation unit 4 can determine the amount of transferable heat such that it does not exceed the sum of the amount of absorbed heat which is requested by the high-temperature cooling circuit HT and the amount of heat dischargeable of the radiator 13 based on amount of absorbed heat which is requested by the high-temperature cooling circuit HT and the amount of heat dischargeable of the radiator 13 in addition to the amount of heat transferable from the refrigerant circuit RE to the high-temperature cooling circuit HT by the operation of the compressor 31.

Figure 7:
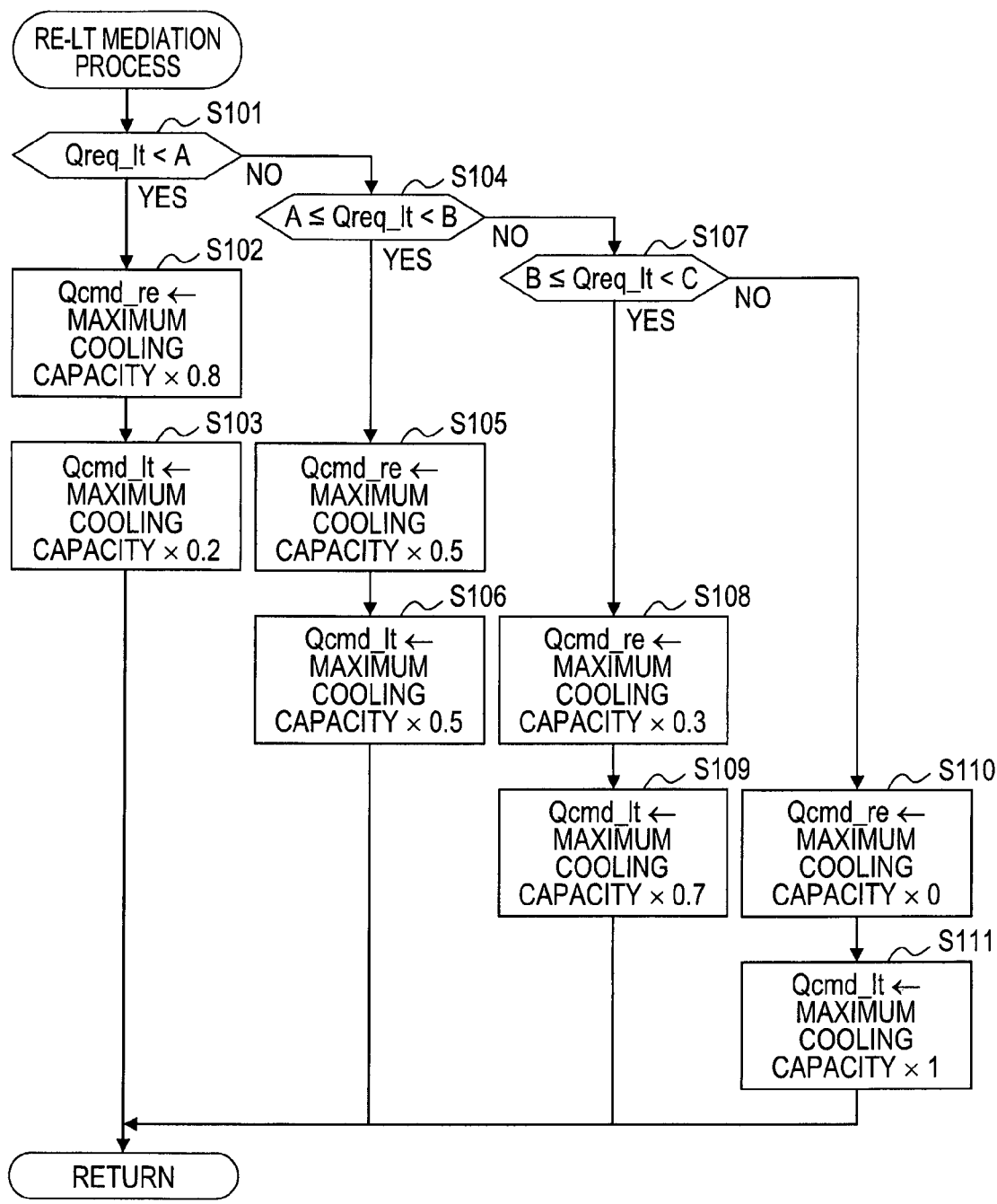
FIG. 7 is a flowchart illustrating an RE-LT mediation process illustrated in FIG. 5.

FIG. 7 is a flowchart illustrating the RE-LT mediation process illustrated in FIG. 5. Values A, B, and C which are used in FIG. 7 are threshold values for distinguishing the magnitudes of the amount of heat requested by the low-temperature cooling circuit LT (the amount of requested heat of the battery 21) and satisfy 0<A<B<C. As the temperature of the battery 21 becomes higher, the amount of discharged heat requested by the battery 21 becomes greater. The threshold value C is an amount of discharged heat with which the battery 21 is to be preferentially cooled.

Step S101: The mediation unit 4 determines whether the amount of requested heat Qreq_lt of the low-temperature cooling circuit LT is less than the threshold value A. The control process progresses to Step S102 when the determination result of Step S101 is YES, and the control process progresses to Step S104 otherwise.

Step S102: The mediation unit 4 allocates the maximum cooling capacity×0.8 as the amount of discharged heat Qcmd_re allowable for the refrigerant circuit RE. Thereafter, the control process progresses to Step S103.

Step S103: The mediation unit 4 allocates the maximum cooling capacity×0.2 as the amount of discharged heat Qcmd_lt allowable for the low-temperature cooling circuit LT. Thereafter, the control process progresses to Step S9 in FIG. 5.

Step S104: The mediation unit 4 determines whether the amount of requested heat Qreq_lt of the low-temperature cooling circuit LT is equal to or greater than the threshold value A and less than the threshold value B. The control process progresses to Step S105 when the determination result of Step S104 is YES, and the control process progresses to Step S107 otherwise.

Step S105: The mediation unit 4 allocates the maximum cooling capacity×0.5 as the amount of discharged heat Qcmd_re allowable for the refrigerant circuit RE. Thereafter, the control process progresses to Step S106.

Step S106: The mediation unit 4 allocates the maximum cooling capacity×0.5 as the amount of discharged heat Qcmd_lt allowable for the low-temperature cooling circuit LT. Thereafter, the control process progresses to Step S9 in FIG. 5.

Step S107: The mediation unit 4 determines whether the amount of requested heat Qreq_lt of the low-temperature cooling circuit LT is equal to or greater than the threshold value B and less than the threshold value C. The control process progresses to Step S108 when the determination result of Step S107 is YES, and the control process progresses to Step S110 otherwise.

Step S108: The mediation unit 4 allocates the maximum cooling capacity×0.3 as the amount of discharged heat Qcmd_re allowable for the refrigerant circuit RE. Thereafter, the control process progresses to Step S109.

Step S109: The mediation unit 4 allocates the maximum cooling capacity×0.7 as the amount of discharged heat Qcmd_lt allowable for the low-temperature cooling circuit LT. Thereafter, the control process progresses to Step S9 in FIG. 5.

Step S110: The mediation unit 4 allocates zero as the amount of discharged heat Qcmd_re allowable for the refrigerant circuit RE. Thereafter, the control process progresses to Step S111.

Step S111: The mediation unit 4 allocates the maximum cooling capacity as the amount of discharged heat Qcmd_lt allowable for the low-temperature cooling circuit LT. Thereafter, the control process progresses to Step S9 in FIG. 5.

When a passenger compartment is cooled and the temperature of the battery 21 is high, the sum of the amount of requested heat of the low-temperature cooling circuit LT and the amount of requested heat of the refrigerant circuit RE may exceed the maximum cooling capacity of the refrigerant circuit RE. In this case, amounts of discharged heat allowable for the refrigerant circuit RE and the low-temperature cooling circuit LT are allocated through the control process illustrated in FIG. 7 such that the maximum cooling capacity of the refrigerant circuit RE is not exceeded. In the control process illustrated in FIG. 7, as the requested amount of discharged heat of the low-temperature cooling circuit LT, that is, the requested amount of discharged heat of the battery 21, increases, the amount of discharged heat allowable for the low-temperature cooling circuit LT is increased and the amount of discharged heat allowable for the refrigerant circuit RE is decreased. According to this control process, when the temperature of the battery 21 increases and the requested amount of discharged heat increases, cooling of a passenger compartment is restricted and cooling of the battery 21 is preferentially performed. When the temperature of the battery 21 decreases and the requested amount of discharged heat decreases, restriction to cooling of a passenger compartment is relaxed. Accordingly, it is possible to achieve compatibility between cooling of the battery 21 and comfortableness of air conditioning.

The numerical values of a distribution ratio (0.8:0.2, 0.5:0.5, 0.3:0.7, and 0:1) which are used to distribute the maximum cooling capacity to the refrigerant circuit RE and the low-temperature cooling circuit LT in FIG. 7 are only examples, and can be appropriately set along with the threshold values A to C of the requested amount of discharged heat of the low-temperature cooling circuit LT. The number of threshold values is not limited to 3, and an arbitrary number of threshold values can be set.

Instead of distributing the cooling capacity of the refrigerant circuit RE at a preset distribution ratio as in FIG. 7, the cooling capacity of the refrigerant circuit RE may be distributed using an optimal solution of the distribution ratio which is calculated by a genetic algorithm in consideration of conditions other than the requested amount of discharged heat of the low-temperature cooling circuit LT (the battery 21).

Figure 8:
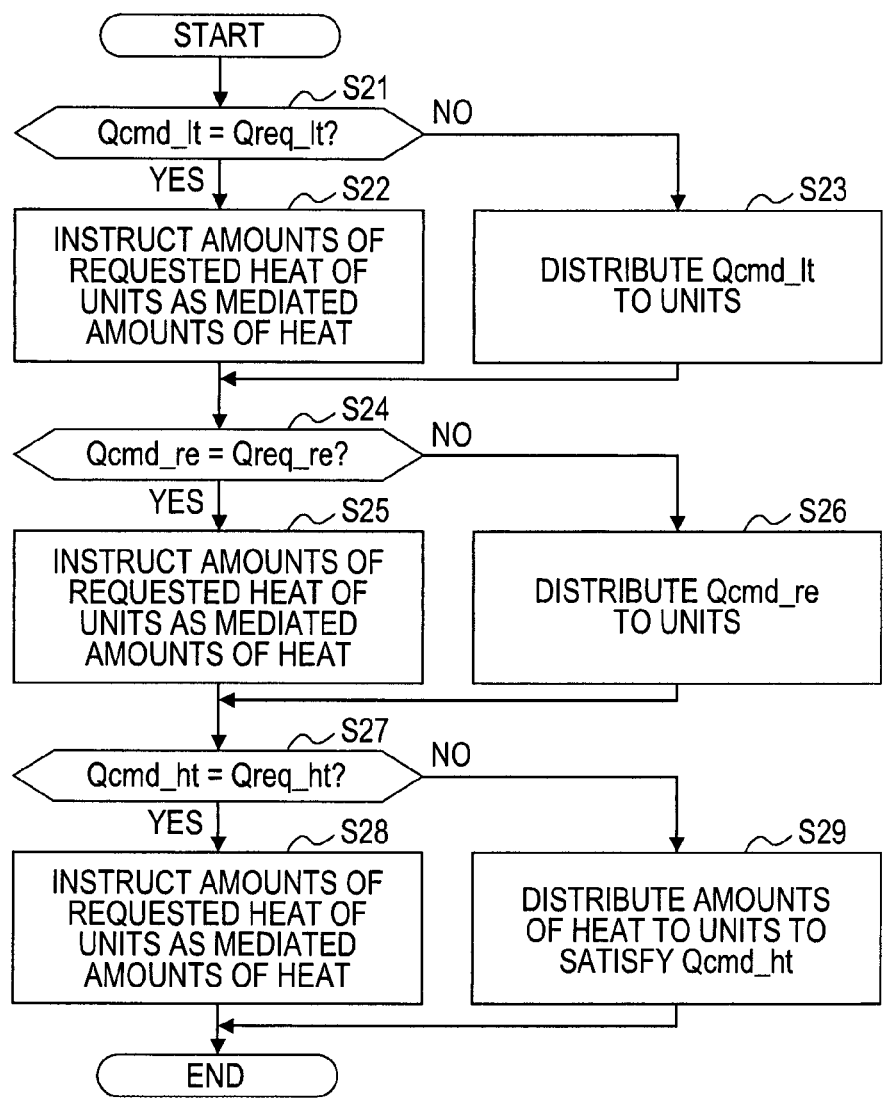
FIG. 8 is a flowchart illustrating a control process which is performed for the thermal request mediating device to distribute amounts of heat to units in each circuit.

FIG. 8 is a flowchart illustrating a control process which is performed for the thermal request mediating device to distribute amounts of heat to the units in each circuit. The control process illustrated in FIG. 8 is performed subsequently to the control process illustrated in FIG. 5.

Step S21: The distribution unit 5 determines whether the amount of allocated heat Qcmd_lt of the low-temperature cooling circuit LT is equal to the amount of requested heat Qreq_lt. The control process progresses to Step S22 when the determination result of Step S21 is YES, and the control process progresses to Step S23 otherwise.

Step S22: The distribution unit 5 distributes the amounts of absorbed heat or amounts of discharged heat which are requested by the units included in the low-temperature cooling circuit LT to the units without any change. Thereafter, the control process progresses to Step S24.

Step S23: The distribution unit 5 distributes the amount of allocated heat Qcmd_lt of the low-temperature cooling circuit LT to the units based on a predetermined distribution rule in the low-temperature cooling circuit LT. The distribution rule can be defined based on a priority level of cooling or heating which is set for each unit in the low-temperature cooling circuit LT. When cooling of a passenger compartment and cooling of the battery 21 are simultaneously requested in a state in which the flow passage of the low-temperature coolant is separated into two parts as illustrated in FIG. 2B, the amount of requested heat of the low-temperature cooling circuit LT illustrated in FIG. 2B is the same as the requested amount of discharged heat of the battery 21 and thus the distribution unit 5 allocates the amount of allocated heat Qcmd_lt of the low-temperature cooling circuit LT as an amount of discharged heat allowable for the battery 21 without any change. Thereafter, the control process progresses to Step S24.

Step S24: The distribution unit 5 determines whether the amount of allocated heat Qcmd_re of the refrigerant circuit RE is equal to the amount of requested heat Qreq_re. The control process progresses to Step S25 when the determination result of Step S24 is YES, and the control process progresses to Step S26 otherwise.

Step S25: The distribution unit 5 distributes the amounts of discharged heat requested by the units included in the refrigerant circuit RE to the units without any change. Thereafter, the control process progresses to Step S27.

Step S26: The distribution unit 5 distributes the amount of allocated heat Qcmd_re of the refrigerant circuit RE to the units based on a predetermined distribution rule in the refrigerant circuit RE. The distribution rule can be defined based on comfortableness in the passenger compartment. Thereafter, the control process progresses to Step S27.

Step S27: The distribution unit 5 determines whether the amount of allocated heat Qcmd_ht of the high-temperature cooling circuit HT is equal to the amount of requested heat Qreq_ht. The control process progresses to Step S28 when the determination result of Step S27 is YES, and the control process progresses to Step S29 otherwise.

Step S28: The distribution unit 5 distributes the amounts of absorbed heat which are requested by the units included in the high-temperature cooling circuit HT to the units without any change. Thereafter, the control process ends.

Step S29: The distribution unit 5 distributes amounts of heat to the units based on a predetermined distribution rule in the high-temperature cooling circuit HT such that the amount of allocated heat Qcmd_ht of the high-temperature cooling circuit HT is satisfied. Specifically, when the amount of allocated heat Qcmd_ht is less than the amount of absorbed heat which is requested by the high-temperature cooling circuit HT, the shortage of the amount of absorbed heat is distributed to the electric heater 12. When the amounts of discharged heat requested by the low-temperature cooling circuit LT and the refrigerant circuit RE are great and the amount of allocated heat Qcmd_ht is greater than the amount of absorbed heat which is requested by the high-temperature cooling circuit HT, the amount of absorbed heat which is distributed to the electric heater 12 is decreased or the amount of heat discharged from the radiator 13 is increased. Thereafter, the control process ends.

After the control process illustrated in FIG. 8 has ended, the controller of each unit included in each thermal circuit controls the unit to be controlled such that the amount of absorbed heat or the amount of discharged heat of the unit becomes the amount of heat distributed by the distribution unit 5. Specifically, as illustrated in Layer 3 in FIG. 4, the temperature of the heater core 11, the output of the electric heater 12, the rotation speed of the radiator fan and/or the opening level of the grille shutter of the radiator 13, the flow rate of the coolant which is controlled by the water pump, and the like are controlled such that the amount of absorbed heat or the amount of discharged heat of each unit becomes the amount of heat which is distributed in the high-temperature cooling circuit HT. In the low-temperature cooling circuit LT, charging and discharging of the battery 21, the output of the PCU 22, the output of the TA 23, the rotation speed of the radiator fan and/or the opening level of the grille shutter of the radiator 24, the flow rate of the coolant which is controlled by the water pump, and the like are controlled such that the amount of absorbed heat or the amount of discharged heat of each unit becomes the amount of heat which is distributed. In the refrigerant circuit RE, the output of the compressor 31, the opening level of the expansion valve for spraying the refrigerant into the evaporator 32, and the like are controlled such that the amount of absorbed heat or the amount of discharged heat of each unit becomes the amount of heat which is distributed.

The thermal request mediating device 1 can be realized by causing a computer such as an ECU including a processor, a ROM, and/or a RAM to perform the control process illustrated in FIGS. 5, 6, and 8.

Advantages or the Like

As described above, the thermal request mediating device 1 according to this embodiment determines amounts of discharged heat allowable for the low-temperature cooing circuit LT and the refrigerant circuit RE such that the sum of the requested amount of discharged heat which is discharged from the low-temperature cooing circuit LT to the refrigerant circuit RE and the requested amount of discharged heat of the refrigerant circuit RE does not exceed the maximum cooling capacity of the refrigerant circuit in a vehicle including the refrigerant circuit for cooling a passenger compartment and the low-temperature cooling circuit for cooling a battery. When the sum of the requested amount of discharged heat which is discharged from the low-temperature cooing circuit LT to the refrigerant circuit RE and the requested amount of discharged heat of the refrigerant circuit RE exceeds the maximum cooling capacity of the refrigerant circuit, the thermal request mediating device increases the amount of discharged heat allowable for the low-temperature cooling circuit LT and decreases the amount of discharged heat allowable for the refrigerant circuit RE as the requested amount of discharged heat from the low-temperature cooling circuit LT to the refrigerant circuit RE increases. Accordingly, it is possible to mediate the amounts of discharged heat of the low-temperature cooling circuit and the refrigerant circuit depending on the temperature of the battery and to achieve compatibility between cooling of the battery and comfortableness of air conditioning. Accordingly, with the thermal request mediating device 1 according to this embodiment, it is possible to appropriately mediate the amounts of discharged heat of the thermal circuits while effectively using the limited cooling capacity in a vehicle including a thermal circuit for cooling a passenger compartment and a thermal circuit for cooling a battery. Since it is not necessary to secure an excessive cooling capacity by increasing the capacity of the compressor 31 or the water-cooled condenser 42, or the like, it is also possible to curb an increase in manufacturing cost. Even when configurations of the units of the low-temperature cooling circuit LT or the refrigerant circuit RE have changed, it is possible to adjust the air-conditioning performance and the priority of cooling of the battery by appropriately changing the distribution ratio of the maximum cooling capacity using the mediation unit 4.

As described above, in the thermal request mediating device 1 according to this embodiment, control for thermal requests of a plurality of units is layered, and distribution of an amount of heat in each thermal circuit and mediation of the requested amounts of heat between the thermal circuits (adjustment of the amounts of heat requested by the thermal circuits) are performed in different control layers. Accordingly, the thermal requests of the units do not need to be individually considered at the time of mediation of the requested amounts of heat between the thermal circuits, and the requested amounts of heat between the thermal circuits do not need to be considered at the time of distribution of the amount of heat in each thermal circuit. Accordingly, it is possible to efficiently perform mediation of the thermal requests from a plurality of units mounted in the vehicle and distribution of the amounts of heat to the units. Since the individual thermal requests form the units are not directly referred to at the time of mediation of the requested amounts of heat between the thermal circuits, the thermal request mediating device 1 according to this embodiment can be applied to a case in which the constituent units of the thermal circuits vary depending on a vehicle model, a grade, a configuration of a power train, or the like, and excellent versatility can be achieved.

By unifying an amount of absorbed heat, an amount of discharged heat, an amount of transferable heat, an amount of transferred heat, and an amount of heat dischargeable which are used for the thermal request mediating device 1 to perform a control process into an amount of thermal energy transferred per unit time, it is possible to easily perform collection, mediation, and distribution of the thermal requests.

Other Modified Examples

In the above-mentioned embodiment, the amounts of absorbed heat or the amounts of discharged heat of the units and the thermal circuits are expressed by amounts of thermal energy transferred per unit time (in units of W), but the amounts of absorbed heat or the amounts of discharged heat of the units and the thermal circuits may be expressed by amounts of thermal energy (in units of J) required for a predetermined control time. In this case, an amount of heat transferable between thermal circuits is expressed by an amount of thermal energy transferred per unit time similarly to the requested amounts of heat. When the amounts of absorbed heat or the amounts of discharged heat of the units are expressed by amounts of thermal energy, it is possible to easily perform collection, mediation, and distribution of requested amounts of heat through the control processes which have been described above with reference to FIGS. 5, 6, and 8 and to reduce an influence of a change of the units of each thermal circuit.

The invention can be used as a thermal request mediating device that mediates a plurality of thermal requests which is generated in a vehicle.

What is claimed is:

1. A thermal request mediating device that is mounted in a vehicle including (i) a first thermal circuit configured to circulate a coolant for cooling a battery and (ii) a second thermal circuit configured to circulate a refrigerant for an air-conditioner while changing a state of the refrigerant and to exchange heat with the first thermal circuit, the thermal request mediating device comprising a processor programmed to:
    acquire a first requested amount of discharged heat and a second requested amount of discharged heat, the first requested amount of discharged heat being an amount of heat discharged per unit time which is requested to be discharged from the first thermal circuit to the second thermal circuit to reach a first target control temperature, and the second requested amount of discharged heat being an amount of heat discharged per unit time which is requested by the second thermal circuit to reach a second target control temperature;
    determine amounts of discharged heat allowable for the first thermal circuit and the second thermal circuit such that a sum of the first requested amount of discharged heat and the second requested amount of discharged heat does not exceed a maximum amount of dischargeable heat of the second thermal circuit; and
    increase the amount of discharged heat allowable for the first thermal circuit and decrease the amount of discharged heat allowable for the second thermal circuit as the first requested amount of discharged heat increases when the sum of the first requested amount of discharged heat and the second requested amount of discharged heat exceeds the maximum amount of dischargeable heat.

2. The thermal request mediating device according to claim 1, wherein
    the second thermal circuit is configured to exchange heat with a third thermal circuit that circulates a coolant, and
    the maximum amount of dischargeable heat is an amount of heat transferrable from the second thermal circuit to the third thermal circuit.

3. The thermal request mediating device according to claim 1, wherein
    the second thermal circuit includes an evaporator configured to absorb heat when a passenger compartment of the vehicle is cooled, and
    the second requested amount of discharged heat includes an amount of heat discharged from the evaporator to the refrigerant.

4. The thermal request mediating device according to claim 1, wherein
    the processor is further programmed to, when the sum of the first requested amount of discharged heat and the second requested amount of discharged heat exceeds the maximum amount of dischargeable heat, determine the amounts of discharged heat allowable for the first thermal circuit and the second thermal circuit based on a distribution rules including at least one of (i) threshold values of the first requested amount of discharged heat and (ii) distribution ratios of the amounts of discharged heat allowable for the first thermal circuit and the second thermal circuit corresponding to the threshold values.

5. The thermal request mediating device according to claim 1, wherein
    the processor is further programmed to, when the sum of the first requested amount of discharged heat and the second requested amount of discharged heat exceeds the maximum amount of dischargeable heat, determine the amounts of discharged heat allowable for the first thermal circuit and the second thermal circuit based on a distribution ratio calculated by a genetic algorithm in consideration of conditions other than the first requested amount of discharged heat.

6. The thermal request mediating device according to claim 1, wherein the processor is further programmed to:
    compare the first requested amount of discharged heat to at least first, second, and third threshold values;
    when the first requested amount of discharged heat is less than the first threshold value, set the amount of discharged heat allowable for the second thermal circuit to be greater than the amount of discharged heat allowable for the first thermal circuit;
    when the first requested amount of discharged heat is greater than the first threshold value but less than the second threshold value, set the amount of discharged heat allowable for the second thermal circuit to be equal to the amount of discharged heat allowable for the first thermal circuit;
    when the first requested amount of discharged heat is greater than the second threshold value but less than the third threshold value, set the amount of discharged heat allowable for the second thermal circuit to be less than the amount of discharged heat allowable for the first thermal circuit; and
    when the first requested amount of discharged heat is greater than the third threshold value, set the amount of discharged heat allowable for the second thermal circuit to be zero and the amount of discharged heat allowable for the first thermal circuit to be a maximum value.

* * * * *